US009902202B2

(12) United States Patent
Shoji et al.

(10) Patent No.: US 9,902,202 B2
(45) Date of Patent: Feb. 27, 2018

(54) NON-PNEUMATIC TIRE

(71) Applicant: BRIDGESTONE CORPORATION, Tokyo (JP)

(72) Inventors: Takanori Shoji, Tokyo (JP); Akihiko Abe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 33 days.

(21) Appl. No.: 15/030,088

(22) PCT Filed: Aug. 11, 2014

(86) PCT No.: PCT/JP2014/071200
§ 371 (c)(1),
(2) Date: Apr. 18, 2016

(87) PCT Pub. No.: WO2015/059984
PCT Pub. Date: Apr. 30, 2015

(65) Prior Publication Data
US 2016/0250893 A1    Sep. 1, 2016

(30) Foreign Application Priority Data
Oct. 21, 2013  (JP) ................................. 2013-218490

(51) Int. Cl.
*B60C 7/14*    (2006.01)
*B60C 7/10*    (2006.01)
(Continued)

(52) U.S. Cl.
CPC ................. *B60C 7/14* (2013.01); *B60B 9/04* (2013.01); *B60B 9/26* (2013.01); *B60C 7/10* (2013.01);
(Continued)

(58) Field of Classification Search
CPC .. B60C 7/10; B60C 7/102; B60C 7/14; B60C 7/16; B60C 7/18; B60C 7/20; B60C 7/24; B60C 7/143
See application file for complete search history.

(56) References Cited

U.S. PATENT DOCUMENTS 1,035,446 A      8/1912  Kamppi
1,118,487 A  *  11/1914  Hayman ................... B60B 9/26
                                                              152/84
(Continued)

FOREIGN PATENT DOCUMENTS

JP        58-36702 A       3/1983
JP      2007-238019 A      9/2007
(Continued)

*Primary Examiner* — Kip T Kotter
(74) *Attorney, Agent, or Firm* — Sughrue Mion, PLLC

(57) ABSTRACT

A connecting member (15) includes a plurality of elastic connecting plates (21) and (22) having both end portions connected to an attachment body and an outer tubular body (13) in a tire width direction (H), outer end portions connected to outer tubular bodies (13) of at least one of the elastic connecting plates (21) and (22) among the plurality of elastic connecting plates disposed in the tire width direction (H) overhang the other portion at both sides in the tire width direction (H), the outer end portion has an overhanging quantity ($W_1$) of an outside outer end portion (25) outward in the tire width direction (H) from an outer end portion main body (27) that is equal to or larger than an overhanging quantity ($W_2$) of an inside outer end portion (26) overhanging the outer end portion main body (27) inward in the tire width direction (H), the length ($L_1$) of the outside outer end portion (25) in the extension direction of the elastic connecting plates (21) and (22) is equal to or larger than a length ($L_2$) of the inside outer end portion (26) in the extension direction, and a cross-sectional area of the outside outer end portion (25) perpendicular to a plate (Continued)

thickness direction of the elastic connecting plates (21) and (22) is larger than a cross-sectional area of the inside outer end portion (26) perpendicular to the plate thickness direction.

4 Claims, 5 Drawing Sheets

(51) Int. Cl.
  *B60C 7/18*   (2006.01)
  *B60B 9/04*   (2006.01)
  *B60C 7/26*   (2006.01)
  *B60B 9/26*   (2006.01)
  *B29D 30/02*   (2006.01)

(52) U.S. Cl.
  CPC ............... *B60C 7/18* (2013.01); *B60C 7/26* (2013.01); *B29D 30/02* (2013.01)

(56) References Cited

U.S. PATENT DOCUMENTS

| 2006/0113016 | A1 | 6/2006 | Cron et al. | |
| 2008/0314486 | A1* | 12/2008 | Manesh | B60C 7/14 152/328 |
| 2010/0218869 | A1* | 9/2010 | Abe | B60B 9/26 152/246 |
| 2011/0108173 | A1* | 5/2011 | Abe | B60C 7/18 152/76 |
| 2011/0240193 | A1* | 10/2011 | Matsuda | B29D 30/00 152/246 |
| 2012/0067481 | A1 | 3/2012 | Cron | |
| 2012/0318417 | A1* | 12/2012 | Dotson | B60C 7/10 152/17 |
| 2013/0048174 | A1 | 2/2013 | Cron | |
| 2016/0280005 | A1* | 9/2016 | Cron | B60C 7/18 |

FOREIGN PATENT DOCUMENTS

| JP | 2011-25757 A | 2/2011 |
| JP | 2011-156906 A | 8/2011 |
| JP | 2011-246051 A | 12/2011 |
| JP | 2012-6560 A | 1/2012 |
| JP | 2013-086712 A | 5/2013 |
| WO | 2012/030519 A2 | 3/2012 |

* cited by examiner

NON-PNEUMATIC TIRE

TECHNICAL FIELD

The present invention relates to a non-pneumatic tire that can be used without being filled with pressurized air.

Priority is claimed on Japanese Patent Application No. 2013-218490, filed Oct. 21, 2013, the content of which is incorporated herein by reference.

BACKGROUND ART

In the related art, for example, a non-pneumatic tire disclosed in the following Patent Document 1 is known. The non-pneumatic tire includes an attachment body attached to an axle, an outer tubular body configured to surround the attachment body from the outside in a tire radial direction, and a connecting member configured to displaceably connect together the attachment body and the outer tubular body, and the connecting member includes an elastic connecting plate having both end portions connected to the attachment body and the outer tubular body.

CITATION LIST

Patent Document

[Patent Document 1]
Japanese Unexamined Patent Application, First Publication No. 2013-86712

SUMMARY OF INVENTION

Technical Problem

Incidentally, in general, in the non-pneumatic tire, for example, while a camber is input when a tire axis, a road surface, and so on, are not parallel to each other, for example, during cornering in a travel of a vehicle, or the like (see FIG. 5), in the non-pneumatic tire of the related art, steering stability when the camber is input should be improved.

In consideration of the above-mentioned circumstances, the present invention is directed to provide a non-pneumatic tire capable of increasing steering stability when a camber is input.

Solution to Problem

The present invention provides a non-pneumatic tire including: an attachment body attached to an axle; an outer tubular body configured to surround the attachment body from the outside in a tire radial direction; and a connecting member configured to displaceably connect the attachment body and the outer tubular body, the connecting member including an elastic connecting plate having both end portions connected to the attachment body and the outer tubular body; wherein the plurality of elastic connecting plates are disposed in a tire width direction; among the plurality of elastic connecting plates disposed in the tire width direction, outer end portions in a tire radial direction connected to the outer tubular body in at least one of the elastic connecting plates overhang other portions disposed inside in the tire radial direction of the outer end portions at both sides in the tire width direction; the outer end portion of the elastic connecting plate has: an outer end portion main body having a width in the tire width direction equal to the width of the other portion, an outside outer end portion overhanging further outward in the tire width direction than the outer end portion main body; and an inside outer end portion overhanging further inward in the tire width direction than the outer end portion main body; an overhanging quantity $W_1$ of the outside outer end portion overhanging outward in the tire width direction from the outer end portion main body is equal to or larger than an overhanging quantity $W_2$ of the inside outer end portion overhanging inward in the tire width direction from the outer end portion main body; a length $L_1$ of the outside outer end portion in an extension direction of the elastic connecting plate is equal to or larger than a length $L_2$ of the inside outer end portion in the extension direction; and a cross-sectional area of the outside outer end portion perpendicular to a plate thickness direction of the elastic connecting plate is larger than a cross-sectional area of the inside outer end portion perpendicular to the plate thickness direction.

According to the non-pneumatic tire of the present invention, among the plurality of elastic connecting plates disposed in the tire width direction, in at least one of the elastic connecting plates, the outer end portion in the tire radial direction connected to the outer tubular body has an outside outer end portion overhanging the outer end portion main body outward in the tire width direction, and the inside outer end portion overhanging the outer end portion main body inward in the tire width direction. Here, since the outside outer end portion of the outer end portion has the overhanging quantity (width dimension) W in the tire width direction and the length (height dimension) L in the extension direction of the elastic connecting plate that are equal to or larger than those of the inside outer end portion, and the cross-sectional area perpendicular to the plate thickness direction that is larger than that of the inside outer end portion, the outside outer end portion is larger than the inside outer end portion, and the stiffness of the outside outer end portion at which a load (stress) is increased when the camber is input can be secured.

That is, with respect to a load received from a road surface or the like when camber input is performed in the non-pneumatic tire, the strength in the outside outer end portion close to the road surface or the like of the elastic connecting plate can be sufficiently secured, and the elastic connecting plate can be prevented from being largely deformed or twisted when the camber is input in comparison with normal circumstances (when no camber is input). Accordingly, the strength of the entire tire is increased regardless of whether the camber is input, and for example, the steering stability during cornering of a two-wheeled vehicle is remarkably improved.

Accordingly, according to the present invention, steering stability when the camber is input can be improved, and good ride comfort can be stably secured.

Further, since the inside outer end portion of the outer end portions in the tire radial direction of the elastic connecting plate is formed to be smaller than the outside outer end portion, the above-mentioned effects by the outside outer end portion are obtained, and for example, in comparison with the case in which the inside outer end portion simply has a line-symmetrical shape having the same shape and the same size as the outside outer end portion unlike the present invention, according to the present invention, the entire weight of the tire can be reduced while suppressing an increase of the weight of the elastic connecting plate.

In addition, in the non-pneumatic tire of the present invention, among the plurality of elastic connecting plates disposed in the tire width direction, the outer end portion main body, the outside outer end portion and the inside outer end portion may be provided at the outer end portion of the elastic connecting plate disposed at an end portion outside in the tire width direction.

According to this configuration, among the plurality of elastic connecting plates arranged in the tire width direction, since the outer end portion main body, the outside outer end portion and the inside outer end portion are formed at the outer end portion of the elastic connecting plate disposed at the end portion outside in the tire width direction at which they approach the road surface or the like most closely when the camber is input and at which the load (stress) is largest, the above-mentioned effects of the present invention are more particularly and remarkably obtained.

In addition, in the non-pneumatic tire of the present invention, the outside outer end portion and the inside outer end portion may overhang in the tire width direction toward the outer tubular body in the extension direction of the elastic connecting plate.

According to this configuration, in each of the outside outer end portion and the inside outer end portion, the stiffness of the end portion of the outer tubular body side in the extension direction of the elastic connecting plate that approaches the road surface or the like most closely when the camber is input is largely increased, and the above-mentioned effects are more particularly and remarkably increased. In addition, since the outside outer end portion and the inside outer end portion widen toward the outer tubular body in the extension direction of the elastic connecting plate, the load from the road surface or the like is prevented from being largely locally applied to portions of the outside outer end portion and the inside outer end portion.

In addition, in the non-pneumatic tire of the present invention, the ratio ($W_2/W_1$) of the overhanging quantity $W_2$ of the inside outer end portion to the overhanging quantity $W_1$ of the outside outer end portion may be 0.33 to 0.8, and the ratio ($L_2/L_1$) of the length $L_2$ of the inside outer end portion to the length $L_1$ of the outside outer end portion may be 0.33 to 0.8.

According to this configuration, the above-mentioned effects of the present invention are likely to be more stably and securely obtained.

That is, when the ratio ($W_2/W_1$) is smaller than 0.33, since the overhanging quantity $W_1$ is large, the width in the tire width direction of the outer tubular body should be increased. As a result, since volumes of the outer tubular body and the connecting member are increased, the entire weight of the tire is likely to be increased. In addition, when the ratio ($W_2/W_1$) is larger than 0.8, the difference between the overhanging quantities $W_1$ and $W_2$ is reduced, and the above-mentioned effects of the present invention are hard to obtain sufficiently. Accordingly, the ratio ($W_2/W_1$) may be within a range of 0.33 to 0.8.

In addition, when the elastic connecting plate is formed by injection molding, in the outer end portion of the elastic connecting plate, the shape of the outside outer end portion and the shape of the inside outer end portion resemble each other (for example, similar shapes or the like), which is preferable in view of obtaining good fluidity upon injection molding. Accordingly, the ratio ($L_2/L_1$) may be within a range of 0.33 to 0.8 to correspond to the ratio ($W_2/W_1$).

Effects of Invention

According to the non-pneumatic tire of the present invention, steering stability when the camber is input can be increased.

DESCRIPTION OF EMBODIMENTS

Hereinafter, a non-pneumatic tire 1 according to an embodiment of the present invention will be described with reference to the accompanying drawings.

Figure 1:
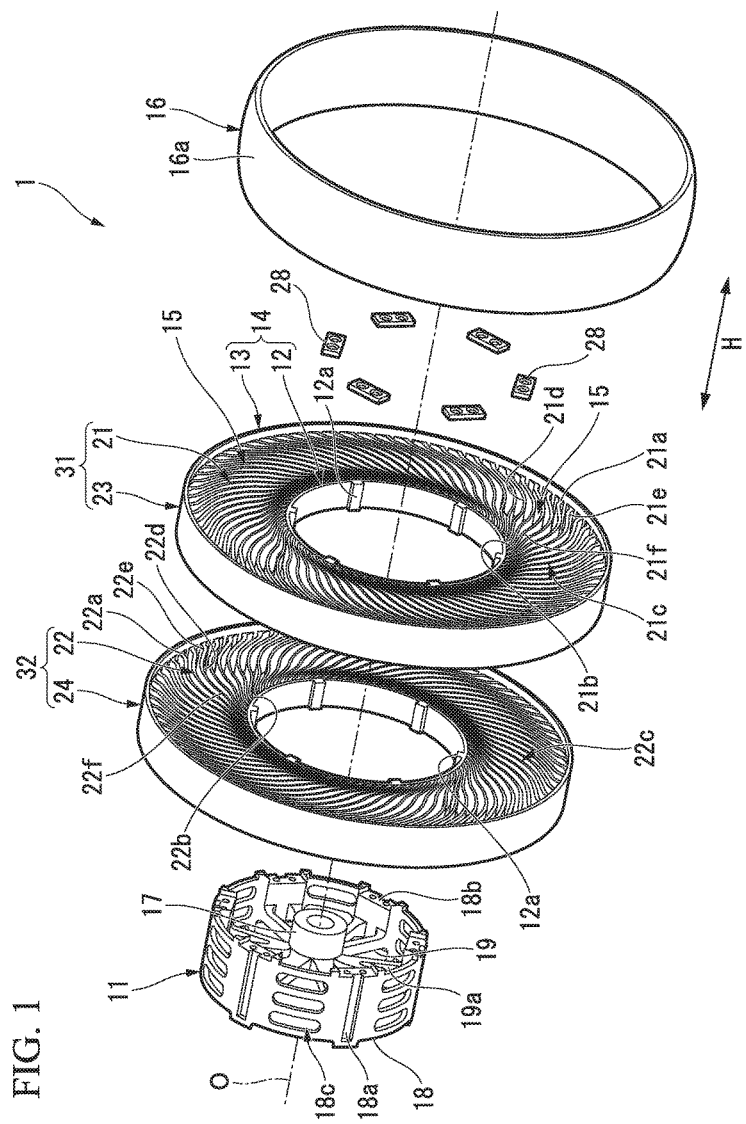
FIG. 1 is an exploded schematic perspective view showing a portion of a non-pneumatic tire of an embodiment according to the present invention.

In FIG. 1, the non-pneumatic tire 1 of the embodiment includes an attachment body 11 attached to an axle (not shown), a ring member 14 including an inner tubular body 12 fitted onto the attachment body 11 and an outer tubular body 13 configured to surround the inner tubular body 12 from the outside in a tire radial direction, a plurality of connecting members 15 disposed between the inner tubular body 12 and the outer tubular body 13 in the tire circumferential direction and configured to connect both of the tubular bodies 12 and 13 to each other while allowing relative elastic displacement therebetween, and a tread member 16 disposed at an outer circumferential surface side of the outer tubular body 13 (outside in the tire radial direction) throughout the circumference.

Here, the attachment body 11, the inner tubular body 12, the outer tubular body 13 and the tread member 16 are disposed coaxially with a common axis. In the specification, the common axis is referred to as an axis O, a direction along the axis O is referred to as a tire width direction H, a direction perpendicular to the axis O is referred to as a tire radial direction, and a direction around the axis O is referred to as a tire circumferential direction. Further, the attachment body 11, the inner tubular body 12, the outer tubular body 13 and the tread member 16 are disposed such that central portions thereof in the tire width direction H coincide with each other.

In the ring member 14, the size in the tire width direction H, i.e., the width, of the outer tubular body 13 is larger than that of the inner tubular body 12. In addition, a plurality of protrusion sections 12a protruding inward in the tire radial direction and extending throughout the length in the tire width direction H are disposed at an inner circumferential surface of the inner tubular body 12 at intervals in the tire circumferential direction.

Figure 2:
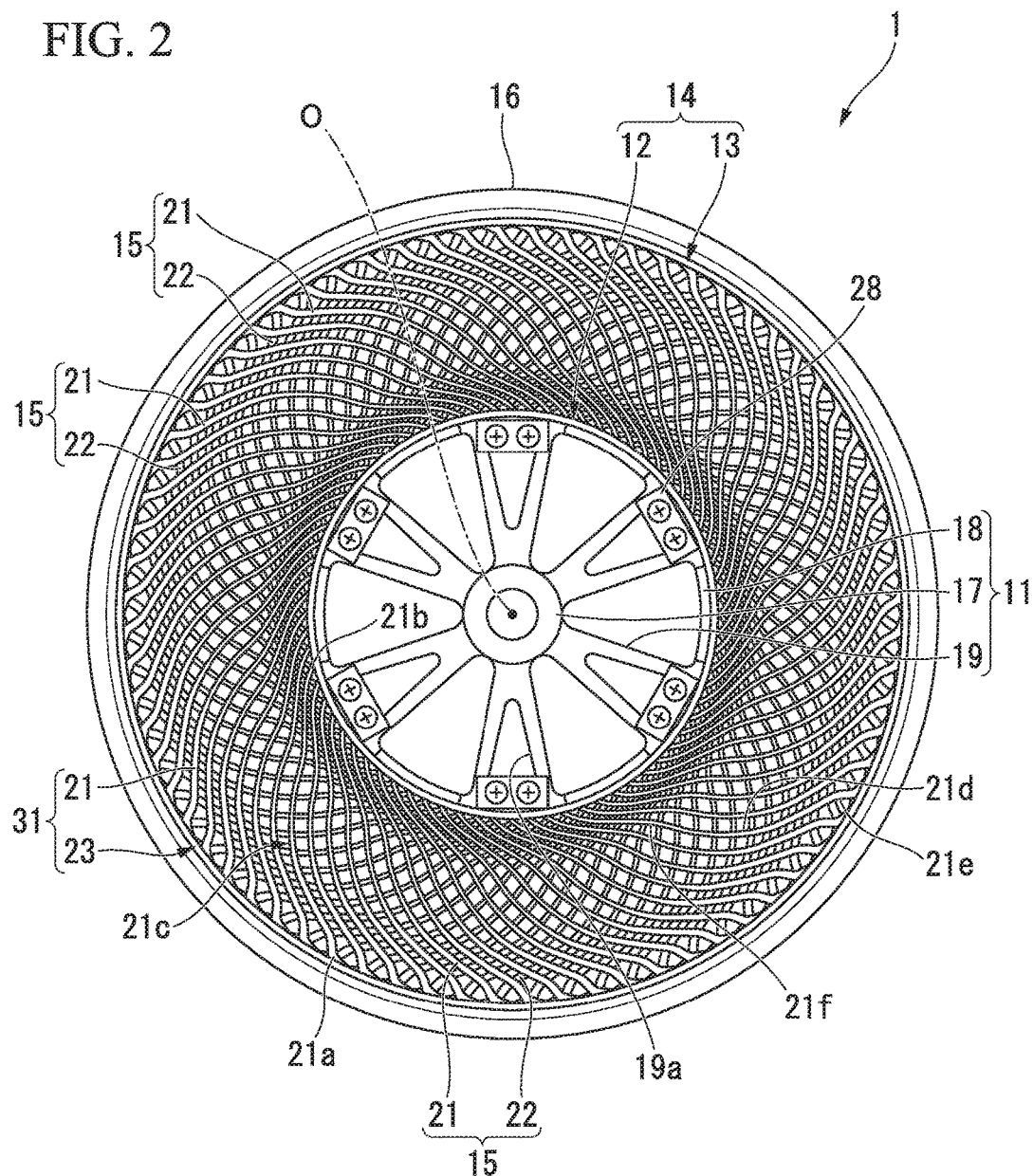
FIG. 2 is a side view of the non-pneumatic tire shown in FIG. 1 seen from one side in a tire width direction.

As shown in FIGS. 1 and 2, the attachment body 11 includes a mounting tubular section 17 on which a front end portion of the axle is mounted, an outer ring section 18 configured to surround the mounting tubular section 17 from the outside in the tire radial direction, and a plurality of ribs 19 configured to connect the mounting tubular section 17 and the outer ring section 18.

The mounting tubular section 17, the outer ring section 18 and the ribs 19 are integrally formed of a metal material such as an aluminum alloy or the like. The mounting tubular section 17 and the outer ring section 18 are formed in a cylindrical shape and disposed coaxially with the axis O. The plurality of ribs 19 are disposed at equal intervals in a circumferential direction.

A plurality of key groove sections 18a recessed inward in the tire radial direction and extending in the tire width direction H are formed in the outer circumferential surface of the outer ring section 18 at intervals in the tire circumferential direction. The key groove section 18a is opened at only a first side of both ends in the tire width direction H and closed at a second side in the outer circumferential surface of the outer ring section 18. The protrusion sections 12a of the inner tubular body 12 of the ring member 14 are fitted into the key groove sections 18a.

Further, among wall surfaces that define each of the key groove sections 18a, a pair of side wall surfaces opposite to each other in the tire circumferential direction are perpendicular to a bottom wall surface. In addition, among outer surfaces of each of the protrusion sections 12a, a pair of side wall surfaces standing up from the inner circumferential surface of the inner tubular body 12 are perpendicular to a top wall surface directed inward in the tire radial direction. The lengths in the tire circumferential direction of the protrusion section 12a and the key groove section 18a are equal to each other.

Here, in an edge of the first side in the tire width direction H of the outer ring section 18, a concave section 18b recessed toward the second side in the tire width direction H and into which a plate member 28 is fitted is formed at a position corresponding to the key groove section 18a. A through-hole is formed in the plate member 28, and among wall surfaces that define the concave section 18b, a female screw section in communication with the through-hole of the plate member 28 fitted into the concave section 18b is formed in the wall surface directed toward the first side in the tire width direction H. Further, the plurality of female screw sections and the plurality of through-holes are formed at intervals in the tire circumferential direction.

Then, the ring member 14 is fixed to the attachment body 11 by screwing bolts into the female screw sections through the through-holes of the plate members 28 fitted into the concave sections 18b in a state in which the inner tubular body 12 is fitted onto the attachment body 11 and the protrusion sections 12a are fitted into the key groove sections 18a. In this state, the protrusion sections 12a are sandwiched between the plate members 28 and the other end wall surfaces disposed at the second end in the tire width direction H and directed toward the first side, among the wall surfaces that define the key groove sections 18a, in the tire width direction H.

Further, in the outer ring section 18, a plurality of hole arrays 18c, in each of which a plurality of weight-reduction holes passing in the tire radial direction are disposed at intervals in the tire width direction H, are formed at portions between the key groove sections 18a neighboring in the tire circumferential direction at intervals in the tire circumferential direction. In addition, weight-reduction holes 19a passing in the tire width direction H are also formed in the ribs 19.

The tread member 16 is formed in a cylindrical shape, and integrally coated on the outer circumferential surface of the outer tubular body 13 of the ring member 14 throughout the region. The tread member 16 is formed of for example, vulcanized rubber in which natural rubber and/or a rubber composition are vulcanized, a thermoplastic material, or the like. For example, a thermoplastic elastomer, a thermoplastic resin, or the like, are exemplary examples of the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber crosslinked body (TPV), another thermoplastic elastomer (TPZ), or the like, as defined in Japanese Industrial Standard JIS K6418, are exemplary examples of the thermoplastic elastomer. For example, a urethane resin, an olefin resin, vinyl chloride resin, a polyamide resin, or the like, are exemplary examples of the thermoplastic resin. Further, in view of abrasion resistance, the tread member 16 may be formed of vulcanized rubber.

Figure 3:
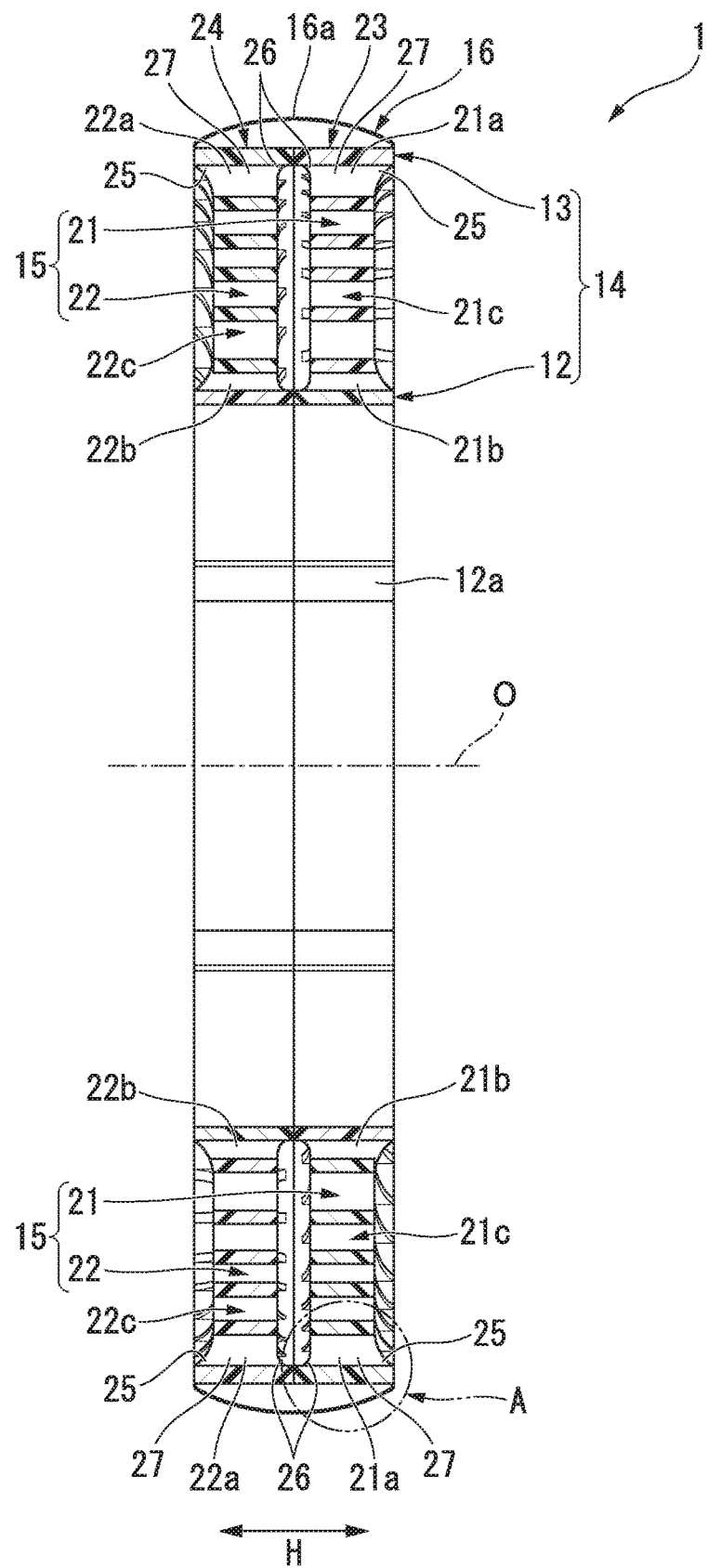
FIG. 3 is a cross-sectional view of a ring member, a connecting member and a tread member of the non-pneumatic tire shown in FIG. 1 in the tire width direction (a cross-sectional view perpendicular to the tire circumferential direction).

The outer circumferential surface of the tread member 16 forms a curved surface shape protruding outward in the tire radial direction when seen in a cross-sectional view in the tire width direction (when seen in a cross-sectional view perpendicular to the tire circumferential direction) shown in FIG. 3, and the outer diameter of the tread member 16 has a diameter that gradually decreases away from a maximum outer diameter portion 16a thereof in the tire width direction H. Further, the outer diameter of the tread member 16 is a distance in the tire radial direction between the outer circumferential surface of the tread member 16 and the axis O. The maximum outer diameter portion 16a of the tread member 16 is disposed at a central portion in the tire width direction H of the non-pneumatic tire 1.

In the example shown, while the thickness in the tire radial direction of the tread member 16 is largest at the maximum outer diameter portion 16a and gradually decreases away from the maximum outer diameter portion in the tire width direction H, the example is not limited thereto. That is, when seen in a cross-sectional view shown in FIG. 3, for example, a thickness in the tire radial direction of the tread member 16 may be equal in the tire width direction H throughout the region while the inner circumferential surface of the tread member 16 is formed in a curved surface shape recessed outward in the tire radial direction. Further, in this case, the outer circumferential surface of the outer tubular body 13 is formed in a curved surface shape protruding outward in the tire radial direction to correspond to the shape of the inner circumferential surface of the tread member 16.

In FIGS. 1 and 2, the connecting member 15 relatively elastically displaceably connects the attachment body 11 and the outer tubular body 13. The connecting member 15 is connected to the attachment body 11 via the inner tubular body 12. The connecting member 15 includes a plurality of elastic connecting plates configured to connect the inner tubular body 12 and the outer tubular body 13 of the ring member 14 in the tire width direction H, and in the embodiment, two elastic connecting plates (a first elastic connecting plate 21 and a second elastic connecting plate 22) are provided in the tire width direction H in parallel.

The plurality of (in the example shown, 60) connecting members 15 are installed in the tire circumferential direction such that the plurality of first elastic connecting plates 21 are disposed in the tire circumferential direction at predetermined positions in the tire width direction H and the plurality of second elastic connecting plates 22 are disposed in the tire circumferential direction at other positions in the tire width direction H different from the predetermined positions in the tire width direction H.

That is, the plurality of first elastic connecting plates 21 are disposed in the tire circumferential direction at the same position in the tire width direction H, and the plurality of second elastic connecting plates 22 are disposed in the tire circumferential direction at a predetermined position in the same tire width direction H spaced apart from the first elastic connecting plates 21 in the tire width direction H.

Further, the plurality of connecting members 15 are disposed between the inner tubular body 12 and the outer tubular body 13 of the ring member 14 at positions that are line-symmetrical with respect to the axis O. In addition, all of the connecting members 15 have the same shape and the same size. Further, the width of the connecting member 15 is smaller than that of the outer tubular body 13.

Then, the first elastic connecting plates 21 neighboring in the tire circumferential direction do not come in contact with each other, and the second elastic connecting plates 22 neighboring in the tire circumferential direction also do not come in contact with each other. Further, the first elastic connecting plate 21 and the second elastic connecting plate 22 neighboring in the tire width direction H also do not come in contact with each other.

Further, the first elastic connecting plate 21 and the second elastic connecting plate 22 have the same width. In addition, the first elastic connecting plate 21 and the second elastic connecting plate 22 also have the same thickness.

Here, a first end portion 21a of the first elastic connecting plate 21 serving as an outer end portion in the tire radial direction connected to the outer tubular body 13 is disposed closer to the first side in the tire circumferential direction than a second end portion 21b serving as an inner end portion in the tire radial direction connected to the inner tubular body 12, and a first end portion 22a of the second elastic connecting plate 22 serving as an outer end portion in the tire radial direction connected to the outer tubular body 13 is disposed closer to the second side in the tire circumferential direction than the second end portion 22b serving as an inner end portion in the tire radial direction connected to the inner tubular body 12.

In addition, the first end portions 21a and 22a of the first elastic connecting plate 21 and the second elastic connecting plate 22 of each of the first connecting members 15 are connected to the same position in the tire circumferential direction on the inner circumferential surface of the outer tubular body 13 at different positions in the tire width direction H.

In each of the first elastic connecting plate 21 and the second elastic connecting plate 22, a plurality of curved sections 21d to 21f and 22d to 22f curved in the tire circumferential direction are formed at intermediate portions 21c and 22c disposed between the first end portions 21a and 22a and the second end portions 21b and 22b in the extension direction in which the elastic connecting plates 21 and 22 extend, in a tire side view when the tire 1 is seen from the tire width direction H.

In each of the elastic connecting plates 21 and 22, among the plurality of curved sections 21d to 21f and 22d to 22f, curved directions of the curved sections 21d to 21f and 22d to 22f neighboring in the extension direction are opposite to each other.

The plurality of curved sections 21d to 21f formed at the first elastic connecting plates 21 have first curved sections 21d curved to protrude toward the second side in the tire circumferential direction, second curved sections 21e disposed between the first curved sections 21d and the first end portions 21a and curved to protrude toward a first side in the tire circumferential direction, and third curved sections 21f disposed between the first curved sections 21d and the second end portions 21b and curved to protrude toward the first side in the tire circumferential direction.

The plurality of curved sections 22d to 22f formed in the second elastic connecting plates 22 have first curved sections 22d curved to protrude toward the first side in the tire circumferential direction, second curved sections 22e disposed between the first curved sections 22d and the first end portions 22a and curved to protrude toward the second side in the tire circumferential direction, and third curved sections 22f disposed between the first curved sections 22d and the second end portions 22b and curved to protrude toward the second side in the tire circumferential direction.

In the example shown, the first curved sections 21d and 22d have larger radii of curvature in the tire side view than the second curved sections 21e and 22e and the third curved sections 21f and 22f. Further, the first curved sections 21d and 22d are disposed at central portions in the extension direction of the first elastic connecting plates 21 and the second elastic connecting plates 22.

Figure 4:
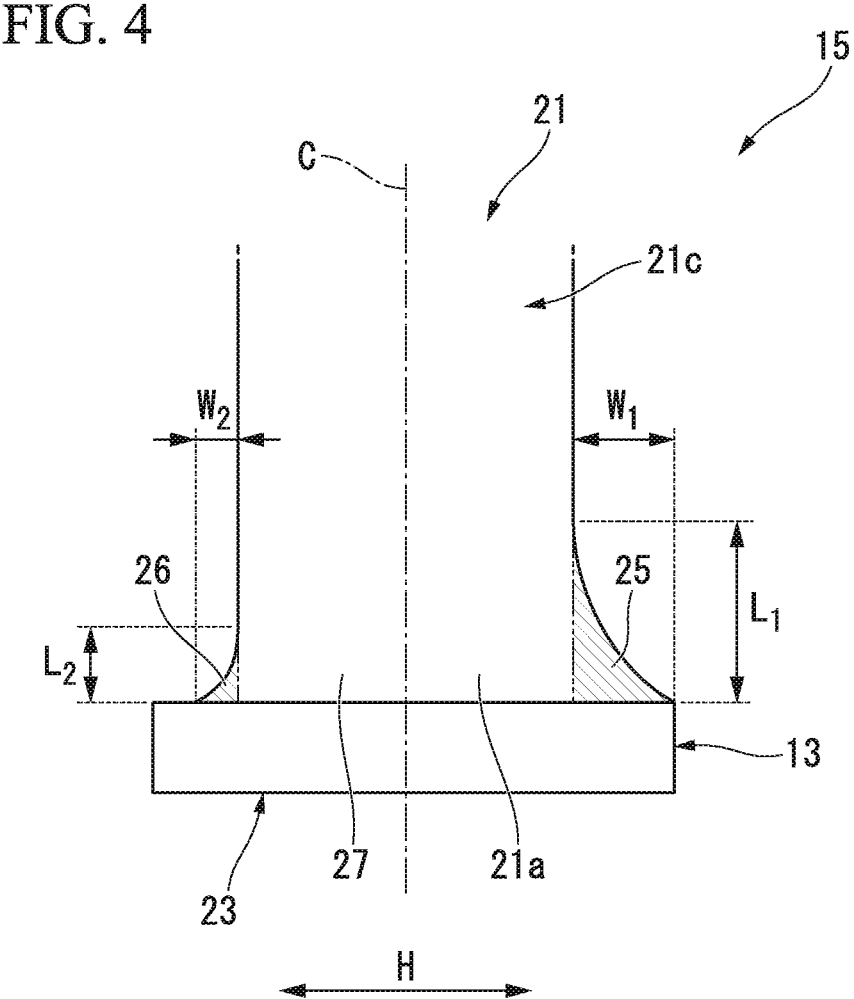
FIG. 4 is an enlarged view of a portion A of FIG. 3.

Further, lengths of both types of the elastic connecting plates 21 and 22 are equal to each other, and as shown in FIG. 4, the second end portions 21b and 22b of both types of the elastic connecting plates 21 and 22 are connected to the first side and the second side on the outer circumferential surface of the inner tubular body 12 in the tire circumferential direction around the axis O from the positions opposite to the first end portions 21a and 22a in the tire radial direction at positions spaced the same angle (for example, 20° to 135°) from each other when seen in the tire side view. In addition, the first curved sections 21d and 22d, the second curved sections 21e and 22e, and the third curved sections 21f and 22f of the first elastic connecting plates 21 and the second elastic connecting plates 22 are directed to protrude in opposite directions in the tire circumferential direction and have the same size.

Accordingly, as shown in FIG. 4, a shape in the tire side view of each of the connecting members 15 is linearly symmetrical with respect to an imaginary line extending in the tire radial direction and passing through the first end portions 21a and 22a of both types of the elastic connecting plates 21 and 22.

In addition, in both types of the elastic connecting plates 21 and 22, a first end-side portion from a central portion in the extension direction to the first end portions 21a and 22a has a thickness larger than that of a second end-side portion from the central portion to the second end portions 21b and 22b. Accordingly, the strength of the first end-side portion in which a large load is easily applied in the first and second elastic connecting plates 21 and 22 can be increased while limiting an increase in weight of the connecting member 15 and securing flexibility of the connecting member 15. Further, the first end-side portion and the second end-side portion are smoothly connected with no step difference therebetween.

Next, among the plurality of elastic connecting plates disposed in the tire width direction H, outer end portions (the first end portions 21a and 22a) in the tire radial direction of at least one of the elastic connecting plates 21 and 22 connected to the outer tubular body 13 overhang at both sides in the tire width direction H farther than the other portions (the intermediate portions 21c and 22c) disposed inside in the tire radial direction of the outer end portions. Specifically, in the embodiment, as shown in FIG. 3, among the plurality of elastic connecting plates disposed in the tire width direction H, in the first and second elastic connecting plates 21 and 22 disposed at the end portion outside in the tire width direction H, the first end portions 21a and 22a serving as outer end portions in the tire radial direction connected to the outer tubular body 13 overhang on both sides in the tire width direction H (outward and inward in the tire width direction H) farther than the other portions disposed inside in the tire radial direction of the first end portions 21a and 22a. In the example shown, the first end portions 21a and 22a of the elastic connecting plates 21 and 22 overhang at both sides in the tire width direction H farther than the intermediate portions 21c and 22c serving as the other portions disposed close to the inside in the tire radial direction of the first end portions 21a and 22a. Further, the first end portions 21a and 22a may also overhang in the tire width direction H further than the second end portions 21b and 22b.

In addition, as shown in FIGS. 3 and 4, the first end portions 21a and 22a of both of the elastic connecting plates 21 and 22 have an outer end portion main body 27 in which a width (a length) in the tire width direction H has the same size as the width of the other portions (the intermediate portions 21c and 22c), an outside outer end portion 25 (in FIG. 4, a portion shown by hatching disposed at a right side of the outer end portion main body 27) overhanging the outer end portion main body 27 outward in the tire width direction H, and an inside outer end portion 26 (in FIG. 4, a portion shown by hatching disposed at a left side of the outer end portion main body 27) overhanging the outer end portion main body 27 inward in the tire width direction H.

Then, in FIG. 4, an overhanging quantity $W_1$ of the outside outer end portion 25 overhanging the outer end portion main body 27 outward in the tire width direction H is equal to or larger than an overhanging quantity $W_2$ of the inside outer end portion 26 from the outer end portion main body 27 inward in the tire width direction H, a length $L_1$ of the outside outer end portion 25 in an extension direction (upward and downward directions of FIG. 4) of the elastic connecting plates 21 and 22 is equal to or larger than a length $L_2$ of the inside outer end portion 26 in the extension direction, and a cross-sectional area of the outside outer end portion 25 perpendicular to a plate thickness direction (a direction perpendicular to a drawing of FIG. 4) of the elastic connecting plates 21 and 22 is larger than a cross-sectional area of the inside outer end portion 26 perpendicular to the plate thickness direction.

That is, in the first end portions 21a and 22a of both of the elastic connecting plates 21 and 22, compared to the inside outer end portion 26 displaced inside (the left side in FIG. 4) the tire width direction H, the outside outer end portion 25 disposed outside (the right side in FIG. 4) in the tire width direction H has an overhanging quantity (a width dimension) W in the tire width direction H from the outer end portion main body 27 that is equal or larger, a length (a height) L in the extension directions of the elastic connecting plates 21 and 22 that is equal or larger, and a cross-sectional area perpendicular to the plate thickness direction that larger.

Specifically, the overhanging quantity $W_1$ of the outside outer end portion 25 overhanging outward in the tire width direction H from the outer end portion main body 27 having the same width dimension as the other portions (in the example shown, the intermediate portions 21c and 22c) except for the first end portions 21a and 22a of the elastic connecting plates 21 and 22 and the other portion of the first end portions 21a and 22a is equal to or larger than the overhanging quantity $W_2$ of the inside outer end portion 26 overhanging the other portion (the intermediate portions 21c and 22c) and the outer end portion main body 27 inward in the tire width direction H, and in the example shown in FIG. 4, the overhanging quantity $W_1$ of the outside outer end portion 25 is equal to or larger than the overhanging quantity $W_2$ of the inside outer end portion 26.

In addition, the length $L_1$ of the outside outer end portion 25 extending from the outer tubular body 13 toward the attachment body 11 (the upper side in FIG. 4) in the extension direction is equal to or larger than the length $L_2$ of the inside outer end portion 26 extending from the outer tubular body 13 toward the attachment body 11, and in the example shown in FIG. 4, the length $L_1$ of the outside outer end portion 25 is larger than the length $L_2$ of the inside outer end portion 26.

Then, a cross-sectional area perpendicular to the plate thickness direction of the outside outer end portion 25 (a cross-sectional area perpendicular to the plate thickness direction of the outside outer end portion 25 shown by hatching in FIG. 4) is larger than the cross-sectional area of the inside outer end portion 26 (the cross-sectional area of the inside outer end portion 26 shown by hatching in FIG. 4).

Further, in the example shown, the overhanging quantity $W_1$ of the outside outer end portion 25 is twice the overhanging quantity $W_2$ of the inside outer end portion 26 or larger, the length $L_1$ of the outside outer end portion 25 is twice the length $L_2$ of the inside outer end portion 26 or larger, and thus the cross-sectional area of the outside outer end portion 25 is four times the cross-sectional area of the inside outer end portion 26 or larger.

Specifically, in the embodiment, a ratio ($W_2/W_1$) of the overhanging quantity $W_2$ of the inside outer end portion 26 to the overhanging quantity $W_1$ of the outside outer end portion 25 is 0.33 to 0.8, and a ratio ($L_2/L_1$) of the length $L_2$ of the inside outer end portion 26 to the length $L_1$ of the outside outer end portion 25 is 0.33 to 0.8.

In addition, the outside outer end portion 25 and the inside outer end portion 26 overhang in the tire width direction H toward the outer tubular body 13 in the extension directions of the elastic connecting plates 21 and 22.

In a front view of the elastic connecting plates 21 and 22 shown in FIG. 4, each of the outside outer end portion 25 and the inside outer end portion 26 has a triangular shape. A circumferential edge (a circumferential wall) of the outside outer end portion 25 directed outward in the tire width direction H gradually overhangs outward in the tire width direction H toward the outer tubular body 13 in the extension direction, and has a concave curved line shape when seen in the front view. In addition, a circumferential edge (a circumferential wall) of the inside outer end portion 26 directed inward in the tire width direction H gradually overhangs inward in the tire width direction H toward the outer tubular body 13 in the extension direction, and has a concave curved line shape having a radius of curvature smaller than that of a circumferential edge of the outside outer end portion 25 when seen in the front view.

In addition, when seen in the front view shown in FIG. 4, circumferential edges of the outside outer end portion 25 and the inside outer end portion 26 are smoothly connected with no step difference with respect to each circumferential edge (circumferential wall) oriented in the tire width direction H of the intermediate portions 21c and 22c.

Here, a dashed line represented by reference character C in FIG. 4 is a centerline of the elastic connecting plates 21 and 22 extending in the extension direction passing through a center in the tire width direction H of the intermediate portions 21c and 22c, and a position in the tire width direction H of the centerline C is disposed inside in the tire width direction H with respect to a center in the tire width direction H of split ring members 23 and 24 (to be described below). Accordingly, in the embodiment, the overhanging quantity $W_1$ of the outside outer end portion 25 can be set to be easily increased to be larger than the overhanging quantity $W_2$ of the inside outer end portion 26. Further, the centerline C of the elastic connecting plates 21 and 22 may coincide with the center in the tire width direction H of the split ring members 23 and 24.

In addition, the centerline C passes through the center in the tire width direction H of the outer end portion main body 27 of the first end portions 21a and 22a of the elastic connecting plates 21 and 22.

In addition, the outside outer end portion 25 and the inside outer end portion 26 have shapes that resemble each other, and specifically, in the example shown, have similar shapes to each other. In detail, the shape of the outside outer end portion 25 can coincide with the shape of the inside outer end portion 26 if the size of the outside outer end portion 25 is reduced while the shape thereof is maintained, and the outside outer end portion 25 is reversed to a line-symmetrical position with respect to the centerline C. In addition, the shape of the inside outer end portion 26 can coincide with the shape of the outside outer end portion 25 if the size of the inside outer end portion 26 is increased while the shape thereof is maintained, and the inside outer end portion 26 is reversed to a line-symmetrical position with respect to the centerline C. That is, in the embodiment, the ratio ($W_2/W_1$) and the ratio ($L_2/L_1$) are equal to each other.

In addition, in the embodiment, the ring member 14 and the plurality of connecting members 15 are integrally formed of a synthetic resin material. Further, the synthetic resin material may be only one kind of resin material, a mixture including two or more kinds of resin materials, or a mixture including one or more kinds of resin materials and one or more kinds of elastomers. Further, the synthetic resin material may include additives such as an anti-oxidant, a plasticizing agent, a filler, a pigment, or the like.

Further, in the embodiment, as shown in FIG. 1, the ring member 14 is split into first split ring member 23 disposed at first side in the tire width direction H, and the second split ring member 24 disposed at the second side in the tire width direction H. Further, in the example shown, the ring member 14 is split at a central portion in the tire width direction H.

Then, the first split ring member 23 is integrally formed with the first elastic connecting plate 21, and the second split ring member 24 is integrally formed with the second elastic connecting plate 22.

Further, in the embodiment, the first split ring member 23 and the first elastic connecting plate 21 are integrally formed by injection molding, and the second split ring member 24 and the second elastic connecting plate 22 are also integrally formed by injection molding.

Hereinafter, a member formed by integrally forming the first split ring member 23 and the first elastic connecting plate 21 is referred to as a first split case body 31, and a member formed by integrally forming the second split ring member 24 and the second elastic connecting plate 22 is referred to as a second split case body 32.

Here, the injection molding may be a general method of simultaneously forming each of the first and second split case bodies 31 and 32 as a whole, or in each of the first and second split case bodies 31 and 32, one of the one and the second split ring members 23 and 24, and the first and second elastic connecting plates 21 and 22 may be formed as an insert part and the other may be formed of insert molding serving as injection molding, or may be formed by so-called two-color formation or the like.

In addition, in each of the first and second split case bodies 31 and 32, the first and the second split ring members 23 and 24, and the first and second elastic connecting plates 21 and 22 may be formed of different materials or may be formed of the same material. Further, while the material may be a metal material, a resin material, or the like, or may be a resin material, in particular, a thermoplastic resin, in view of a reduction in weight.

Further, when each of the first and second split case bodies 31 and 32 is simultaneously formed by injection molding as a whole, the plurality of protrusion sections 12a formed at the inner tubular body 12 may be a gate portion.

In each of the first and second split case bodies 31 and 32, a central portion (a center) in the tire width direction H of the outer tubular body 13 coincides with a central portion in the tire width direction H of the inner tubular body 12, and each central portion in the tire width direction H of the outer tubular body 13 and the inner tubular body 12 is disposed outside in the tire width direction H with respect to the central portion (the centerline C) in the tire width direction H of the first and second elastic connecting plates 21 and 22. Further, in each of the first and second split case bodies 31 and 32, a central portion in the tire width direction H of the outer tubular body 13 may be disposed outside in the tire width direction H with respect to the central portion in the tire width direction H of the inner tubular body 12, and in this case, the central portion in the tire width direction H of the inner tubular body 12 may coincide with the central portion (the centerline C) in the tire width direction H of the first and second elastic connecting plates 21 and 22.

Then, edges in the tire width direction H of the outer tubular body 13 of the first split ring member 23 and the outer tubular body 13 of the second split ring member 24 are connected by, for example, welding, fusion, adhesion, or the like. Further, among these, in the case of welding, for example, hot plate welding or the like may be employed.

In addition, in the example shown in FIG. 3, edges in the tire width direction H of the inner tubular body 12 of the first split ring member 23 and the inner tubular body 12 of the second split ring member 24 are connected by, for example, welding, fusion, adhesion, or the like. Further, edges in the tire width direction H of the inner tubular body 12 of the first split ring member 23 and the inner tubular body 12 of the second split ring member 24 may be separated from each other in the tire width direction H. In this case, generation of burrs on the inner circumferential surface of the inner tubular body 12 fitted onto the attachment body 11 is prevented.

In addition, the first split case body 31 and the second split case body 32 have the same shape and the same size in a state before these case bodies 31 and 32 are connected as described above.

Then, when connected as described above, the non-pneumatic tire 1 is obtained by butting and connecting the edges in the tire width direction H of the outer tubular bodies 13 and the inner tubular bodies 12 of the first split case body 31 and the second split case body 32 such that the connecting members 15 are line-symmetrical as described above in the tire side view, in a state in which orientations in the tire width direction H of both of the split case bodies 31 and 32 are opposite to each other while matching positions in the tire circumferential direction of the first split case body 31 and the second split case body 32.

According to the non-pneumatic tire 1 of the above-mentioned embodiment, among the plurality of elastic connecting plates disposed in the tire width direction H, in at least one of the elastic connecting plates 21 and 22, outer end portions (the first end portions 21a and 22a) in the tire radial direction connected to the outer tubular body 13 have the outside outer end portion 25 overhanging the outer end portion main body 27 outward in the tire width direction H, and the inside outer end portion 26 overhanging the outer end portion main body 27 inward in the tire width direction H. Then, since, compared to the inside outer end portion 26, the outside outer end portion 25 of the outer end portion has the overhanging quantity (the width dimension) W in the tire width direction H and the length (the height dimension) L in the extension directions of the elastic connecting plates 21 and 22 that are equal or larger, and the cross-sectional area perpendicular to the plate thickness direction that is larger, the outside outer end portion 25 can be formed to be larger than the inside outer end portion 26, and stiffness of the outside outer end portion 25 in which a load (stress) is increased when a camber is input can be secured.

Figure 5:
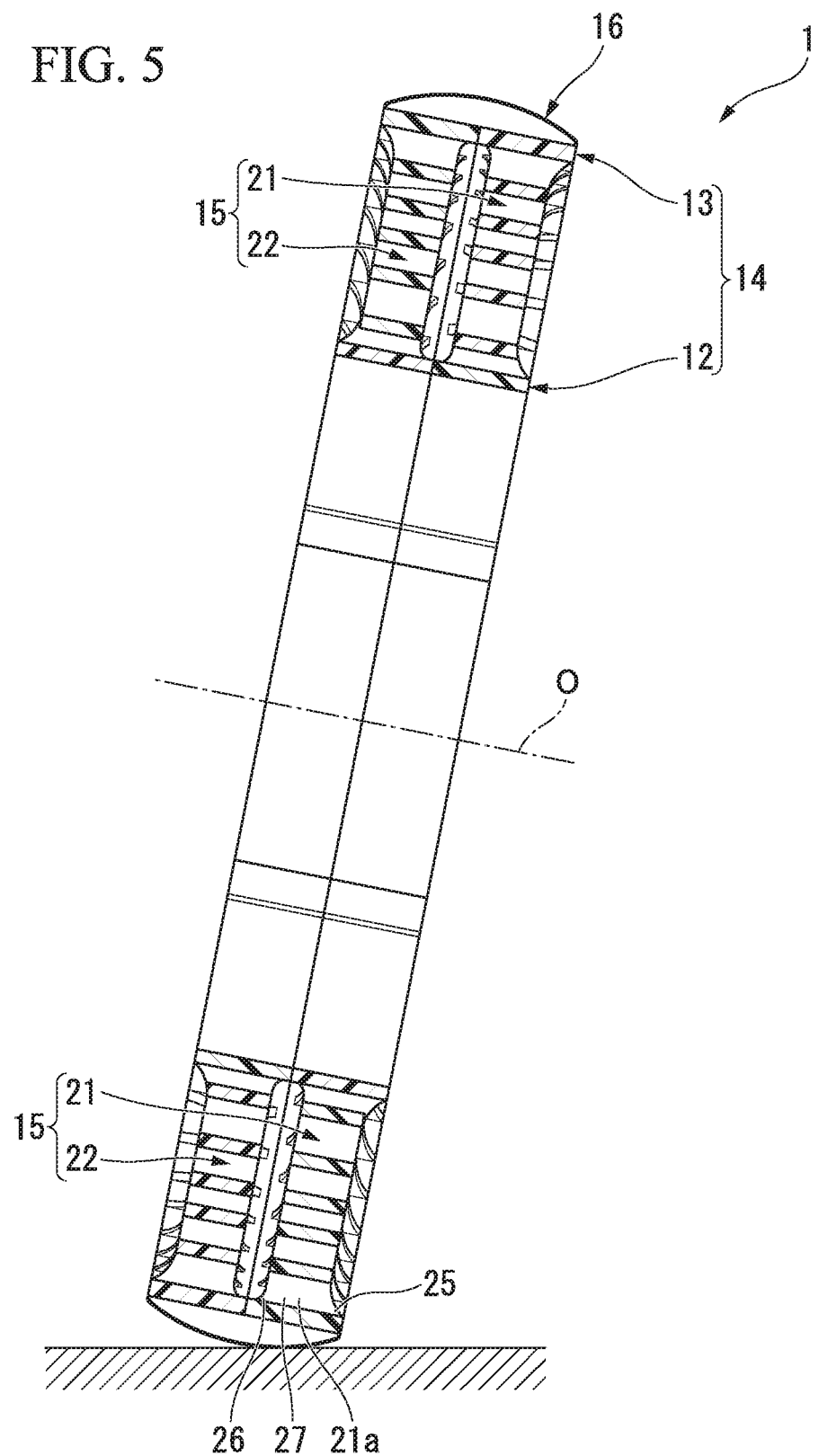
FIG. 5 is a view showing a state (a posture) of the non-pneumatic tire shown in FIG. 3 when a camber is input.

That is, as shown in FIG. 5, with respect to a load received from a road surface or the like when the camber is input in the non-pneumatic tire 1, strength of the outside outer end portion 25 of the elastic connecting plate 21 (22) close to the road surface or the like can be sufficiently secured, and the elastic connecting plate 21 (22) can be suppressed from largely deformed or twisted when the camber is input in comparison with normal circumstances (when no camber is input). Accordingly, the strength of the entire tire is increased regardless of whether the camber is input, and for example, steering stability during cornering or the like of a two-wheeled vehicle is remarkably improved.

According to the non-pneumatic tire 1 of the above-mentioned embodiment, steering stability when the camber is input can be improved, and good ride comfort can be stably secured.

Further, in the outer end portions (the first end portions 21a and 22a) in the tire radial direction of the elastic connecting plates 21 and 22, since the inside outer end portion 26 is formed to be smaller than the outside outer end portion 25, even when the above-mentioned effects are obtained by the outside outer end portion 25, for example, in comparison with a case in which the inside outer end portion simply has a line-symmetrical shape of the same shape and the same size as the outside outer end portion unlike the embodiment, according to the embodiment, the weight of the entire tire can be reduced while an limited in the weight of the elastic connecting plates 21 and 22 can be suppressed.

In addition, among the plurality of elastic connecting plates disposed in the tire width direction H, since the outer end portion main body 27, the outside outer end portion 25 and the inside outer end portion 26 are provided at the outer end portions (the first end portions 21a and 22a) of the elastic connecting plates 21 and 22 disposed at the end portion outside in the tire width direction H, the following effects are obtained.

That is, according to the above-mentioned configuration, among the plurality of elastic connecting plates arranged in the tire width direction H, since the outer end portion main body 27, the outside outer end portion 25 and the inside outer end portion 26 are installed at the outer end portions (the first end portions 21a and 22a) of the elastic connecting plates 21 and 22 disposed at the end portion outside in the tire width direction H in which the load (stress) is largest while approaching the road surface or the like most closely when the camber is input, the effects of the above-mentioned embodiment are more particularly and remarkably obtained.

In addition, since the outside outer end portion 25 and the inside outer end portion 26 overhang in the tire width direction H toward the outer tubular body 13 in the extension directions of the elastic connecting plates 21 and 22, respectively, the following effects are obtained.

That is, according to the above-mentioned configuration, in each of the outside outer end portion 25 and the inside outer end portion 26, as stiffness of the end portions of the outer tubular body 13 side in the extension directions of the elastic connecting plates 21 and 22 closest to the road surface or the like when the camber is input is largely increased, the above-mentioned effects are more particular and remarkable. In addition, since the outside outer end portion 25 and the inside outer end portion 26 have widths that increase toward the outer tubular body 13 in the extension directions of the elastic connecting plates 21 and 22, respectively, a load from the road surface or the like is prevented from being largely locally applied to portions of the outside outer end portion 25 and the inside outer end portion 26. Further, in the embodiment, as shown in FIG. 4, because the outside outer end portion 25 gradually overhangs outward in the tire width direction H with respect to the outer end portion main body 27 toward the outer tubular body 13 in the extension direction, and in addition, the inside outer end portion 26 gradually overhangs inward in the tire width direction H with respect to the outer end portion main body 27 toward the outer tubular body 13 in the extension direction, that is, because the first end portions 21a and 22a are gradually widened outward in the tire radial direction, the above-mentioned effects are more remarkably exhibited.

In addition, since the ratio ($W_2/W_1$) of the overhanging quantity $W_2$ of the inside outer end portion 26 to the overhanging quantity $W_1$ of the outside outer end portion 25 is 0.33 to 0.8 and the ratio ($L_2/L_1$) of the length $L_2$ of the inside outer end portion 26 to the length $L_1$ of the outside outer end portion 25 is 0.33 to 0.8, the following effects are exhibited.

That is, according to the configuration, the effects of the above-mentioned embodiment are likely to be more stably and reliably obtained.

Specifically, when the ratio ($W_2/W_1$) is smaller than 0.33, since the overhanging quantity $W_1$ is increased, the width in the tire width direction H of the outer tubular body 13 should be increased. As a result, since volumes of the outer tubular body 13 and the connecting member 15 are increased, the weight of the entire body is likely to be increased. In addition, when the ratio ($W_2/W_1$) is larger than 0.8, the difference between the overhanging quantities $W_1$ and $W_2$ is reduced, and the effects of the above-mentioned embodiment are hard to obtain sufficiently. Accordingly, the ratio ($W_2/W_1$) may be within a range of 0.33 to 0.8.

In addition, when the elastic connecting plates 21 and 22 are formed by injection molding, in the outer end portions (the first end portions 21a and 22a) of the elastic connecting plates 21 and 22, the shape of the outside outer end portion 25 and the shape of the inside outer end portion 26 resemble each other (for example, the similar shapes or the like described in the embodiment), which is preferable in a viewpoint of obtaining good fluidity upon injection molding. Accordingly, the ratio ($L_2/L_1$) may be within a range of 0.33 to 0.8 to correspond to the ratio ($W_2/W_1$).

Further, the present invention is not limited to the above-mentioned embodiment but various modifications may be made without departing from the spirit of the present invention.

For example, in the above-mentioned embodiment, while a configuration in which the first elastic connecting plate 21 and the second elastic connecting plate 22 provided as the connecting member 15 one by one is shown, instead of this, a configuration in which the first elastic connecting plate 21, the second elastic connecting plate 22 and another elastic connecting plate are provided at the one connecting member 15 in the tire width direction H, i.e., a configuration in which three or more elastic connecting plates are disposed in the tire width direction H may be employed. In this case, among the plurality of elastic connecting plates disposed in the tire width direction H, in at least one elastic connecting plate, the outer end portions in the tire radial direction including the outside outer end portion 25, the inside outer end portion 26 and the outer end portion main body 27 described above may be formed. Further, among the plurality of elastic connecting plates disposed in the tire width direction H, in the elastic connecting plate disposed at the end portion outside at least in the tire width direction H, the outer end portions in the tire radial direction including the outside outer end portion 25, the inside outer end portion 26 and the outer end portion main body 27 described above may be formed.

In addition, in the above-mentioned embodiment, while the outside outer end portion 25 and the inside outer end portion 26 overhang in the tire width direction H toward the outer tubular body 13 in the extension directions of the elastic connecting plates 21 and 22, respectively, the embodiment is not limited thereto. Specifically, in the present invention, compared to the inside outer end portion 26, the outside outer end portion 25 may have the overhanging quantity W in the tire width direction H that is equal or larger, the length L in the extension direction that is equal or larger, and the cross-sectional area perpendicular to the plate thickness direction that is larger. That is, shapes of the outside outer end portion 25 and the inside outer end portion 26 are not limited to the triangular shape when seen in the front view described in the above-mentioned embodiment, but may be a polygonal shape other than the triangular shape (for example, a trapezoidal shape) and so on when seen in the front view.

In addition, in each of the outside outer end portion 25 and the inside outer end portion 26, while circumferential edges (circumferential walls) directed in the tire width direction H form concave curved line shapes of the elastic connecting plates 21 and 22, the shapes of the edges are not limited thereto. Here, for example, when the overhanging quantity $W_1$ of the outside outer end portion 25 is equal to the overhanging quantity $W_2$ of the inside outer end portion 26 and the length $L_1$ of the outside outer end portion 25 is equal to the length $L_2$ of the inside outer end portion 26, the cross-sectional area of the outside outer end portion 25 can be increased to be larger than the cross-sectional area of the inside outer end portion 26 by forming the circumferential edge of the outside outer end portion 25 in a linear shape when seen in the front view and forming the circumferential edge of the inside outer end portion 26 in a concave curved shape when seen in the front view, and the above-mentioned effects of the present invention can be obtained. Further, the circumferential edges of the outside outer end portion 25 and the inside outer end portion 26 may be formed in, for example, when seen in the front view, convex curved line shapes or the like instead of the concave curved line shape or the linear shape.

In addition, the ring member 14 and the plurality of connecting members 15 may be integrally formed with each other.

Furthermore, the ring member 14 and the connecting member 15 are not limited to the above-mentioned embodiment. For example, the outer tubular body 13 and the attachment body 11 may be relatively elastically displaceably connected via the connecting member 15 without installation of the inner tubular body 12.

Additionally, the components described in the above-mentioned embodiment and variant (provision or the like) of the present invention may be appropriately combined. In addition, the above-mentioned components can be substituted with known components without departing from the spirit of the present invention.

Next, a verification test of the effects as described above was performed.

In the verification test, two non-pneumatic tires of an example and a comparative example were prepared.

In the non-pneumatic tire according to the example, the non-pneumatic tire 1 shown in FIGS. 1 to 5 of the above-mentioned embodiment was employed. In addition, in the example, the ratio ($W_2/W_1$) in the outer end portions (the first end portions 21a and 22a) in the tire radial direction of the elastic connecting plates 21 and 22 was 0.5, and the tire having the ratio ($L_2/L_1$) of 0.5 was used.

In the non-pneumatic tire according to the comparative example, a tire in which the overhanging quantities W, the lengths L and the cross-sectional areas of the outside outer end portion 25 and the inside outer end portion 26 were equal to the non-pneumatic tire 1 of the example was employed. That is, the ratio ($W_2/W_1$) was 1.0, the ratio ($L_2/L_1$) was 1.0, and the cross-sectional areas were equal to each other.

Further, values of $W_1$, $W_2$, $L_1$ and $L_2$ shown in the following Table 1 were represented as indices of the example with respect to the comparative example having a reference value of 100.

Sizes of all of the non-pneumatic tires were 3.00-8.

Then, in the non-pneumatic tires of the example and the comparative example, weights and strengths were measured and the indices of the example were estimated with respect to the comparative example having a reference value of 100. Further, to measure the strength of each of the non-pneumatic tires, in a state (a posture) corresponding to that when the camber is input as shown in FIG. 5, the non-pneumatic tires were compressed in a vertical direction and a compressive force at which the connecting member was broken was calculated by numerical analysis.

A lower weight values indicates a better result, and a higher strength value indicates a better result.

The results are shown in Table 1.

TABLE 1

| | $W_1$ | $W_2$ | $W_2/W_1$ | $L_1$ | $L_2$ | $L_2/L_1$ | Weight | Strength |
|---|---|---|---|---|---|---|---|---|
| Embodiment | 100 | 50 | 0.5 | 100 | 50 | 0.5 | 92 | 105 |
| Comparative Example | 100 | 100 | 1.0 | 100 | 100 | 1.0 | 100 | 100 |

As shown in Table 1, it was confirmed that the weight of the non-pneumatic tire 1 of the example can be reduced by 8% with respect to the weight of the non-pneumatic tire of the comparative example, and the strength of the non-pneumatic tire 1 of the example can be improved by 5% with respect to the strength of the non-pneumatic tire of the comparative example. Specifically, the non-pneumatic tire 1 capable of securing the strength while reducing the weight in comparison with the comparative example can be provided as long as the shape of the example satisfies the ratio ($W_2/W_1$)=0.5 and the ratio ($L_2/L_1$)=0.5.

INDUSTRIAL APPLICABILITY

According to the present invention, in the non-pneumatic tire, the steering stability when the camber is input can be increased.

DESCRIPTION OF REFERENCE SIGNS

1 Non-pneumatic tire
11 Attachment body
13 Outer tubular body
15 Connecting member
21 First elastic connecting plate
21*a* First end portion (outer end portion)
22 Second elastic connecting plate
22*a* First end portion (outer end portion)
25 Outside outer end portion
26 Inside outer end portion
27 Outer end portion main body
H Tire width direction
L ($L_1$, $L_2$) Length
W ($W_1$, $W_2$) Overhanging quantity

What is claimed is:

1. A non-pneumatic tire comprising:
an attachment body configured to be attached to an axle;
an outer tubular body configured to surround the attachment body from the outside in a tire radial direction; and
a connecting member configured to displaceably connect together the attachment body and the outer tubular body,
the connecting member including a plurality of elastic connecting plates each having an inner end portion connected to the attachment body and an outer end portion connected to the outer tubular body,
wherein the plurality of elastic connecting plates are disposed in a tire width direction, and
the outer end portions in a tire radial direction connected to the outer tubular body in at least one of the elastic connecting plates overhang other portions of the elastic connection plates disposed inside in the tire radial direction of the outer end portions at both sides in the tire width direction;
each outer end portion of the elastic connecting plate has:
an outer end portion main body having a width in the tire width direction equal to the width of the other portion,
an outside outer end portion overhanging further outward in the tire width direction than the outer end portion main body, and
an inside outer end portion overhanging further inward in the tire width direction than the outer end portion main body;
an overhanging quantity W1 of the outside outer end portion overhanging outward the outer end portion main body in the tire width direction is equal to or larger than an overhanging quantity W2 of the inside outer end portion overhanging the outer end portion main body inward in the tire width direction;
a length L1 of the outside outer end portion in an extension direction of the elastic connecting plate is equal to or larger than a length L2 of the inside outer end portion in the extension direction; and
a cross-sectional area of the outside outer end portion perpendicular to a plate thickness direction of the elastic connecting plate is larger than a cross-sectional area of the inside outer end portion perpendicular to the plate thickness direction,
wherein a ratio (W2/W1) of the overhanging quantity W2 of the inside outer end portion to the overhanging quantity W1 of the outside outer end portion is 0.33 to 0.8; and
a ratio (L2/L1) of the length L2 of the inside outer end portion to the length L1 of the outside outer end portion is 0.33 to 0.8.

2. The non-pneumatic tire according to claim 1, wherein, among the plurality of elastic connecting plates disposed in the tire width direction, the outer end portion main body, the outside outer end portion and the inside outer end portion are provided at the outer end portion of the elastic connecting plate disposed at an end portion outside in the tire width direction.

3. The non-pneumatic tire according to claim 2, wherein the outside outer end portion and the inside outer end portion overhang in the tire width direction toward the outer tubular body in an extension direction of the elastic connecting plate.

4. The non-pneumatic tire according to claim 1, wherein the outside outer end portion and the inside outer end portion overhang in the tire width direction toward the outer tubular body in an extension direction of the elastic connecting plate.

* * * * *